United States Patent [19]

Alpers

[11] 3,801,981

[45] Apr. 2, 1974

[54] REMOTE CLOCK SYNCHRONIZATION SYSTEM

[75] Inventor: Frederick C. Alpers, Riverside, Calif.

[73] Assignee: The United States of America as represented by the Secretary of the Navy, Washington, D.C.

[22] Filed: Apr. 23, 1971

[21] Appl. No.: 136,989

[52] U.S. Cl. .................................................. 343/7.5
[51] Int. Cl. ............................................... G01s 9/56
[58] Field of Search ..................................... 343/7.5

[56] References Cited
UNITED STATES PATENTS

| 3,250,896 | 5/1966 | Perinson et al. | 343/7.5 |
| 3,440,652 | 4/1969 | Bates et al. | 343/7.5 |

Primary Examiner—Stephen C. Bentley
Attorney, Agent, or Firm—R. S. Sciascia; G. J. Rubens; T. M. Phillips

[57] ABSTRACT

A system for the precise synchronization of high frequency electronic clocks by providing each station other than the master station with a tracking circuit. The tracking circuit consists of an early gate generated just prior to the arrival of the synchronizing pulse from the master station and a late gate generated just after the synchronizing pulse is received from the master station. If the synchronizing pulse received from the master station is either late or early the clock will either speed up or slow down so that it will be in synchronization with the synchronizing pulses received from the master station.

6 Claims, 4 Drawing Figures

REMOTE CLOCK SYNCHRONIZATION SYSTEM

STATEMENT OF GOVERNMENT INTEREST

The invention described herein may be manufactured and used by or for the Government of the United States of America for governmental purposes without the payment of any royalties thereon or therefor.

SUMMARY OF THE INVENTION

The present invention provides a system for the precise synchronization of high frequency electronic clocks at stations that are remotely located from one another. In certain military applications it is desirable to have remotely located clocks synchronized to within a few nanoseconds in order to measure the time of arrival of microwave or other radiated signals at several different stations, or to measure the propagation time between two or more stations. The present invention is concerned with relatively short cycle electronic clocks (i.e., clocks with time events during a total cycle on the order of one second as opposed to the normal 12 hours). The location of these clocks may be in aircraft, missiles or other moving vehicles as well as at fixed ground stations. One such location is selected as the command or master station and the remaining stations are identified as remote stations. It is required that the clocks of each of the remote stations be synchronized precisely with the clock at the master station so that all clocks may begin timing events at precisely the same instant (accurate to within a few nanoseconds). With this synchronization achieved the combination of precise starting and precise timing thereafter will permit events such as reception of a given enemy radar pulse at various aircraft to be measured in essentially absolute time, and corrections for clock differences are obviated. If the synchronization process is repeated at frequent intervals, the need for a very large number of additional bits to identify the exact time of a given event or time of arrival of a given pulse can be avoided.

Accordingly an object of the invention is to provide a remote clock synchronization system that is both automatic and frequent so that highly precise pulse time of arrival and event timing measurements can be made without requiring extreme clock stability;

Another object of the invention is a provision of the remote clock synchronization system in which synchronization and beacon pulses are used in a manner which permits many remote stations to be synchronized to a given master station concurrently rather than in series;

A further object of the invention is the provision of self-synchronous tracking circuits to provide actual synchronization of clock oscillators so that event timing measurements are independent of the particular distance between stations and any changes in distances.

Still another object of the invention is a provision of a remote clock synchronization system in which the beacon pulses can serve a station keeping as well as a synchronization function.

Other objects and many of the attendant advantages of this invention will be readily appreciated as the same becomes better understood by reference to the following detailed description when considered in connection with the accompanying drawings wherein.

Figure 1:
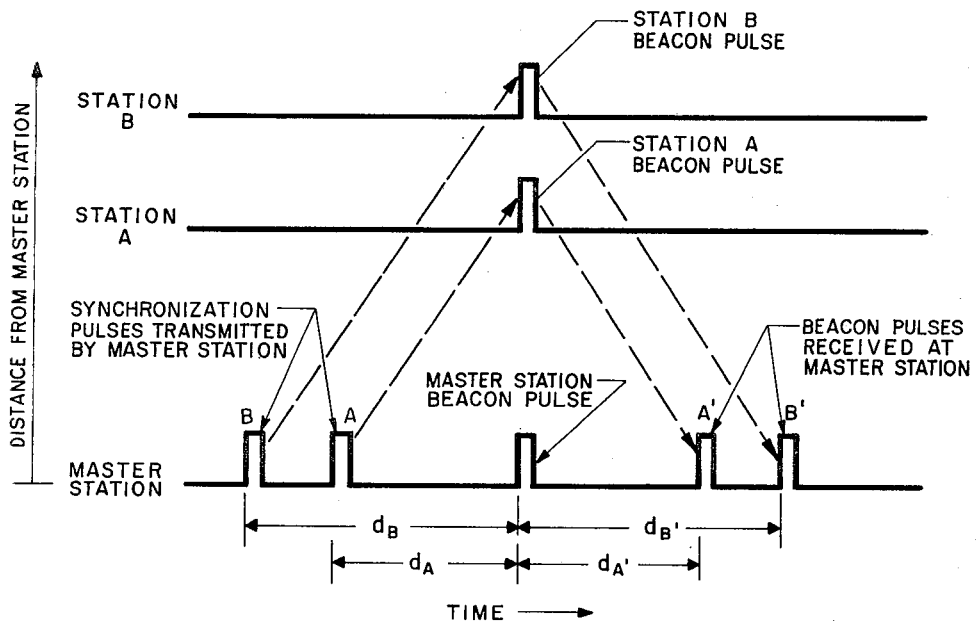
FIG. 1 is a diagram of waveforms illustrating the principle of operation.

Referring to FIG. 1, a situation is shown in which the master station and two remote stations, station A and station B, each transmit a pulse of electromagnetic energy at the instant of the start of a new clock cycle at that particular station. These pulses are hereinafter identified as the "beacon" pulses for the respective stations. In addition, synchronization pulses A and B are transmitted by the master station at times prior to the master station beacon pulse. If synchronization pulse A arrives at remote station A in exact coincidence with transmission of the station A beacon pulse, and the station A beacon pulse is received at the master station at a time such that the intervals $d_A$ and $d_A$ are equal, then the station A beacon pulse must occur in exact coincidence with the master station beacon pulse, which is the situation desired. Similarly, the station B beacon pulse will occur in exact coincidence with master station beacon pulse if its transmission is coincident with the arrival of synchronization pulse B and if $d_B$ equals $d_B$. The synchronization of many additional stations can be similarly provided. In each case the two requisite conditions can be achieved through use of a self-synchronous tracking circuit at the remote station involved and suitable programming of the applicable synchronization pulse at the master station. Means for obtaining this suitable programming at the master station and the self synchronous tracking at the remote station will be taught in connection with FIG. 3 and FIG. 4, respectively.

With the pulse timing arrangement illustrated in FIG. 1, practical problems in electromagnetically isolating a receiver from an adjacent transmitter when both are to operate simultaneously will necessitate use of widely separated electromagnetic frequencies for the remote station beacon pulse and the corresponding synchronization pulse from the master station. However, such use of widely separated frequencies is not always acceptable, particularly in military environments. This leads to the alternate pulse timing arrangement shown in FIG. 2, where a fixed interval, $\delta$, is inserted between the synchronization pulse and beacon pulse timings for each station. It is apparent that for the special case of $\delta = 0$, the timing sequences of FIG. 2 become identical to those of FIG. 1. Thus further discussion need be concerned only with the more general situation shown in FIG. 2.

Figure 2:
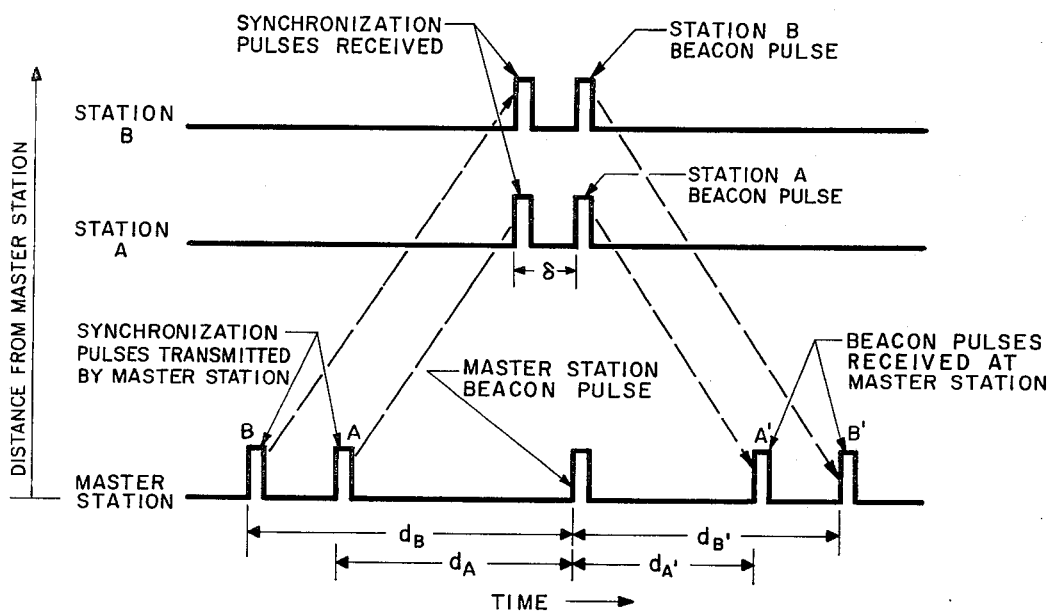
FIG. 2 is a modification of the diagram of FIG. 1 showing the insertion of a fixed delay ($\delta$)

In FIG. 2, the station A beacon pulse will occur simultaneously with the master station beacon pulse (and hence the clocks of the two stations will be precisely synchronized) when both (1) the station A synchronization pulse arrives at station A at a time that proceeds the station A beacon pulse by the interval $\delta$, and (2) the station A beacon pulse is received at the master station at a time such that interval $d_A$ equals interval $d_{A'}$ plus interval $\delta$. Similarly, the station B clock will be synchronized with the master station clock when both (1) the station B synchronization pulse arrives at an interval $\delta$ ahead of the station B beacon pulse, and (2) the interval $d_B = d_{B'} + \delta$. In the present invention, conditions (1) above are met through the action of self-synchronous tracking circuits (to be described later) that are present at each of the remote stations. Conditions (2) are met by synchronization timing control circuits located at the master station, with one such circuit present at the master station for each remote station that is to be synchronized.

Figure 3:
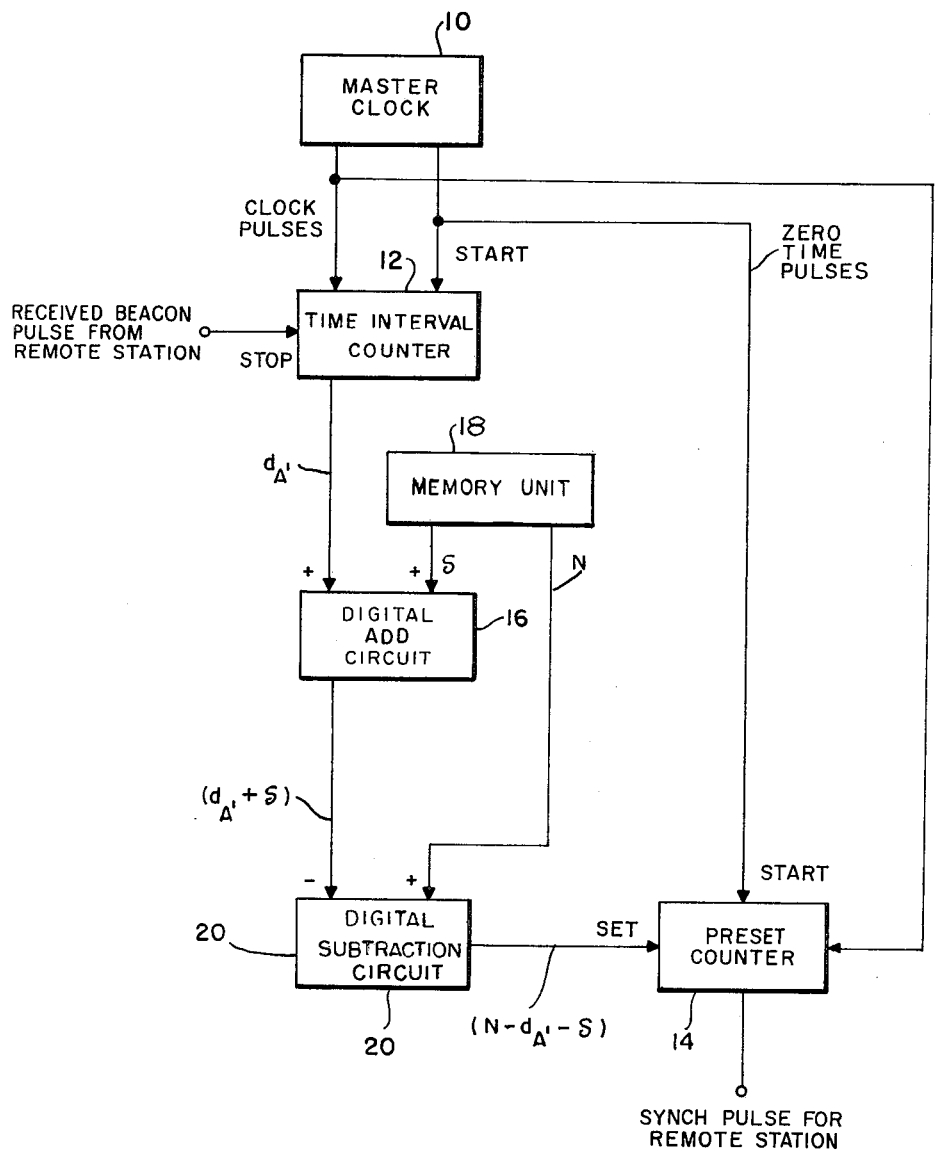
FIG. 3 is a block diagram of a synchronization pulse timing control circuit for generating a synchronization pulse in accordance with the teaching of the invention.

The block diagram of a synchronization timing circuit is shown in FIG. 3. A master clock generates both high rate clock pulses (e.g., one every four nanoseconds) and low rate zero time pulses (e.g., one approximately every quarter of a second), where the ratio of the two rates is a large integral number, N, that remains constant (e.g., $N = 2^{26}$) and determines the duration of a clock cycle. The clock pulses and the zero time pulses are each fed both to time interval counter 12 and to a preset counter 14. Beacon pulses received from remote station A are also fed to time interval counter 12, and the connections are such that the zero time pulses are applied to the start input of counter 12 and the station A beacon pulses are applied to the stop input. The output of counter 12 is therefore the counted number of clock pulses between zero time in a given clock cycle and the reception of the station A beacon pulse in that cycle. By reference to FIG. 2 it is apparent that this counter output number is a measure, in terms of basic clock pulse time units, of the time interval identified as $d_{A'}$.

The output number from counter 12 is fed to digital adding circuit 16. A memory unit 18 also supplies a number to adding circuit 16, which number is fixed with the design of the system and is equal to the selected interval $\delta$ as measured in basic clock pulse time units (e.g., units of 4 nanoseconds each). The output of adding circuit 16 is therefore a number equivalent to the quantity ($d_{A'} + \delta$). This output is fed as a subtrahend to digital subtraction circuit 20. Memory unit 18 feeds a fixed number as the minuend to subtraction circuit 20, which number is N, the number of basic clock pulse time intervals between the start of one clock cycle and the start of the following cycle. The output of subtraction circuit 20 is therefore the quantity $(N - d_{A'} - \delta)$ as measured in basic clock pulse time units. The subtraction circuit 20 output is connected as the numerical input that sets preset counter 14.

With the inputs described above, preset counter 14 is constrained to commence counting clock pulses at zero time in each counting cycle, and to cease counting and deliver an output pulse when a count of $(N - d_{A'} - \delta)$ is reached. The output pulse from counter 14 then becomes the synchronization pulse for remote station A and is relayed to that station by a suitable transmitter (not shown). In FIG. 2, this station A synchronization pulse is shown to lead the master station beacon pulse (the zero time pulse) for the following cycle by a time interval that is identified as $d_A$. Thus in terms of the original cycle, the time interval $d_A$ and the number N are defined in such ways that the station A synchronization pulse appears after $(N-d_A)$ basic clock pulse time units in the cycle, while the action of preset counter 14 and the other circuits described dictates that the station A synchronization pulse occurs at the $(N-d_{A'} -\delta)$ point in the cycle. The circuit action is therefore one which forces $N - d_A = N - d_{A'} - \delta$
or $d_A = d_{A'} + \delta$ which is precisely the condition (2) required for proper synchronization of remote station A to the master station. Identical circuits serve for remote station B and any additional remote stations.

Figure 4:
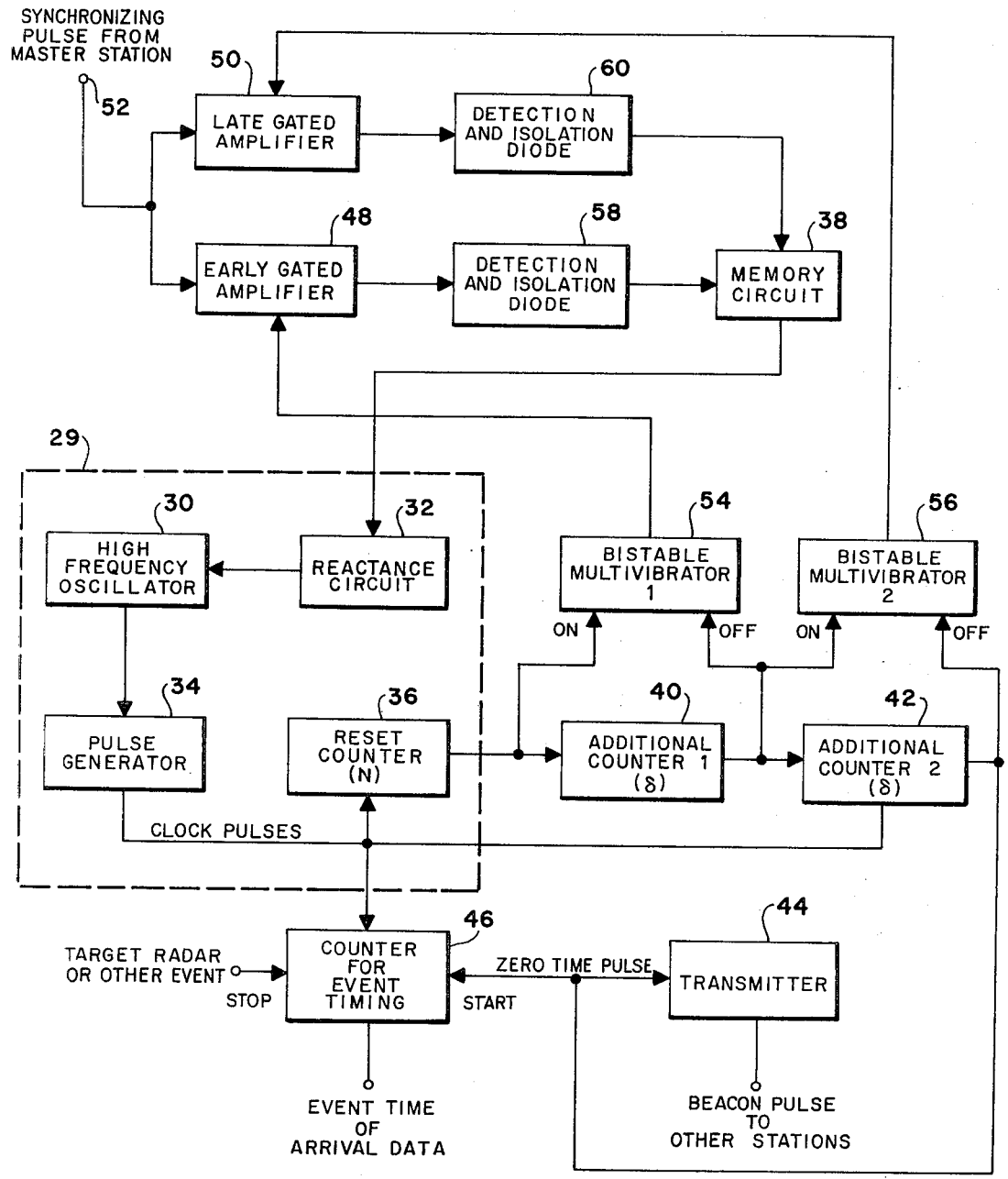
FIG. 4 is a block diagram of a tracking circuit for synchronizing clock pulses at the remote station with the master station.

The synchronization and tracking circuitry of each of the remote stations in shown in FIG. 4. The electronic clock 29 consists of a high frequency oscillator 30, reactance circuit 32, pulse generator 34, and preset counter 36. Oscillator 30 could typically be a crystal type operating at a frequency nominally the same as that of master clock 10 in the master station (e.g., 250 MHz). Reactance circuit 32 should be one which changes the tuning of oscillator 30 very slightly in consonance with a D.C. control voltage that is fed from memory circuit 38. Pulse generator 34 should be a high frequency, very short pulse type that generates a clock pulse for each cycle of the oscillator. Clock pulses will then occur at evenly spaced intervals for a few nanoseconds, which intervals should be nominally the same as the basic clock pulse time intervals of the master station. Preset counter 36 could typically be of the binary type that counts clock pulses up to a predetermined total N, which is the same as the N for the master station, and then automatically recycles itself to begin a new count. At each full-count or recycling point preset counter 36 delivers an output pulse for use in the follow-on circuitry. The output pulse from clock preset counter 36 is coupled to the first of two additional counters 40 and 42 that are connected in series. Each of counters 40 and 42 introduce an additional count on the order of $2^6$ to $2^{10}$ clock pulses following the input pulse before producing an output pulse of its own. Counters 40 and 42 should be of the non-recycling type and must wait for an input trigger pulse before they start counting. The delays between input and output that are generated in this manner are each made equal to the desired delay $\delta$ discussed above. The output of additional counter 42 becomes the zero time pulse for this station and it is used both to trigger transmitter 44 to generate the beacon pulse for this station and to start counter 46 for event timing.

Synchronization of the remote station in such a way as to fulfill condition (1) discussed above is effected through the use of early and late gated amplifiers 48 and 50 that sense whether clock 29 tends to lead or lag the synchronizing pulses received from the master clock at input terminal 52. Gating signals for gated amplifiers 48 and 50 are generated by bistable multivibrators 54 and 56, respectively, which in turn are synchronized by the counters 40 and 42 described above. Multivibrator 54 provides an early gate having a duration that commences at the time of the output pulse from preset counter 36, and terminates at the time of the output pulse from counter 40. Multivibrator 56 provides a late gate of equal width that begins at the termination of the early gate from multivibrator 54 and terminates at zero time in the following clock cycle. The junction of the two gates therefore always leads the zero time pulse of the station by $\delta$. The tracking action of the remote station depends upon which of the gated amplifiers 48 and 50 are gated on when the synchronizing pulse from the master station arrives at input terminal 52. If the synchronizing pulse arrives during the interval of duration $\delta$ while bistable multivibrator 54 and early gated amplifier 48 are in the on condition, a pulse signal indication of early tracking results at the output of amplifier 48. Similarly, if the synchronizing pulse from the master station arrives during the ensuing interval of duration δ when multivibrator 56 and gated amplifier 50 are on, a pulse signal indicative of late tracking occurs at the output of amplifier 50. A balanced tracking condition will occur when the incoming pulse at terminal 52 arrives just as multivibrator 54 is turning off and multivibrator 56 is turning on, which is the instant when the pulse at terminal 52 leads the local zero time by precisely the desired lead time, δ. The remainder of the tracking loop consists of diodes 58 and 60 which detect the early and late tracking signals, respectively, and memory circuit 38 which feeds back the control voltage to reactance circuit 32. Diodes 58 and 60 should be arranged in shunt and series, respectively, so as to add a positive increment to the memory circuit voltage when the synchronization pulse coincides with the early gate, and a negative increment when coincidence is with the late gate. Diodes 58 and 60 also should be back-biased to provide isolation of memory circuit 38 when no correction signals are present. Memory circuit 38 can be simply a storage capacitor with a cathode follower type output. With the memory provided by memory circuit 38 and the self recycling capability of electronic clock 29 the tracking becomes self synchronous; that is, once a balanced tracking condition has been achieved, the circuit of FIG. 4 will recycle itself in proper synchronization without always requiring reception of a synchronizing pulse from the master station. At this point further tracking action is required only when the frequency of high frequency oscillator 30 tends to drift apart from the frequency established by clock 10 in the master station. This self synchronous capability is of value in certain military situations where the reception of synchronization pulses from the master station may be temporarily disrupted due to aircraft motion, interferring signals, or the like.

Obviously many modifications and variations of the present invention are possible in the light of the above teachings. It is therefore to be understood that within the scope of the appended claims the invention may be practiced otherwise than as specifically described.

What is claimed is:

1. In a remote clock synchronizing system, the combination comprising:
   a. a high frequency oscillator,
   b. a pulse generator coupled to said oscillator for generating an output pulse for each cycle of said oscillator,
   c. a preset counter coupled to said pulse generator for generating an output pulse and recycling after a predetermined number of pulses are received from said pulse generator,
   d. an input terminal for receiving synchronizing pulses from a remotely located master station,
   e. a first multivibrator coupled to a preset counter for generating a first gate signal so as to commence in response to the output pulse from said preset counter and to terminate after a first predetermined time delay.
   f. a second multivibrator coupled to said preset counter for generating a second gate signal so as to commence immediately upon termination of said first gate signal and to terminate after a second predetermined time delay.
   g. gate circuit means coupled to said input terminal and to said first and second multivibrators and having an output coupled to said oscillator for gating an output signal to increase the output frequency of said oscillator when said first gate signal is in coincidence with said synchronizing pulse and an output signal to decrease the output frequency of said clock when said second gate signal is in coincidence with said synchronizing pulse.

2. The synchronizing system of claim 1 wherein a memory circuit is coupled between said gate circuit means and said oscillator to maintain the adjusted frequency during the time interval between pulses received from said master station.

3. The synchronizing system of claim 1 wherein said second predetermined time delay is a counter circuit whose output provides the zero time pulse so that said time delay is accurately maintained.

4. The synchronizing system of claim 3 wherein said first and second multivibrators are bistable multivibrators, said first bistable multivibrator being turned on by the output pulse from said preset counter and being turned off by a first delayed signal initiated by the output pulse from said preset counter, said second bistable multivibrator being turned on by said first delayed signal and being turned off by a second delayed signal initiated by said first delayed signal.

5. The synchronizing system of claim 4 wherein said gate circuit means includes:
   a. a first gated amplifier for passing synchronizing pulses when received in coincidence with the gate signal from said first bistable multivibrator and a second gated amplifier for passing synchronizing pulses received in coincidence with the gate signal from said second bistable multivibrator.

6. The system of claim 5 wherein said master station utilizes the time of arrival of a beacon pulse from said remote station to generate a synchronization pulse such that the travel time of the master pulse to the remote station is equal to the travel time of the remote station beacon pulse plus said second time delay and varying distances between stations are automatically accommodated.

* * * * *